United States Patent [19]

Bowsky

[11] Patent Number: 4,888,039
[45] Date of Patent: Dec. 19, 1989

[54] APPARATUS FOR MANUFACTURING HERMETIC TERMINAL ASSEMBLIES

[75] Inventor: Benjamin Bowsky, Warren County, Ohio

[73] Assignee: Emerson Electric Co., St. Louis, Mo.

[21] Appl. No.: 272,933

[22] Filed: Nov. 18, 1988

Related U.S. Application Data

[62] Division of Ser. No. 732,704, May 10, 1985, Pat. No. 4,804,396.

[51] Int. Cl.$^4$ ............................................... H01J 9/18
[52] U.S. Cl. ....................................... 65/139; 65/138; 65/154; 65/155; 65/59.25; 65/59.27; 65/59.6
[58] Field of Search ........... 65/138.36, 154.40, 155.42, 65/59.1, 59.2, 59.25, 59.27, 59.6, 154, 58, 155, DIG. 4, DIG. 11, DIG. 12, 139

[56] References Cited

U.S. PATENT DOCUMENTS

| | | | |
|---|---|---|---|
| 2,648,167 | 8/1953 | Ellwood | 65/DIG. 12 X |
| 3,460,219 | 8/1969 | Shiragaki | 65/155 X |
| 4,450,033 | 5/1984 | Little | 65/36 X |

*Primary Examiner*—Arthur Kellogg
*Attorney, Agent, or Firm*—Polster, Polster and Lucchesi

[57] ABSTRACT

Apparatus for forming glass to metal hermetic seals in a terminal assembly of a housing part wherein an upwardly directed glass melting heating gradient is applied to a housing part having a glass sleeved terminal pin supportedly disposed in an aperture therein with sufficient heat intensity to flow the glass sleeve in an upwardly direction from bottom to top to fuse the terminal pin in the housing part with minimal voids.

11 Claims, 2 Drawing Sheets

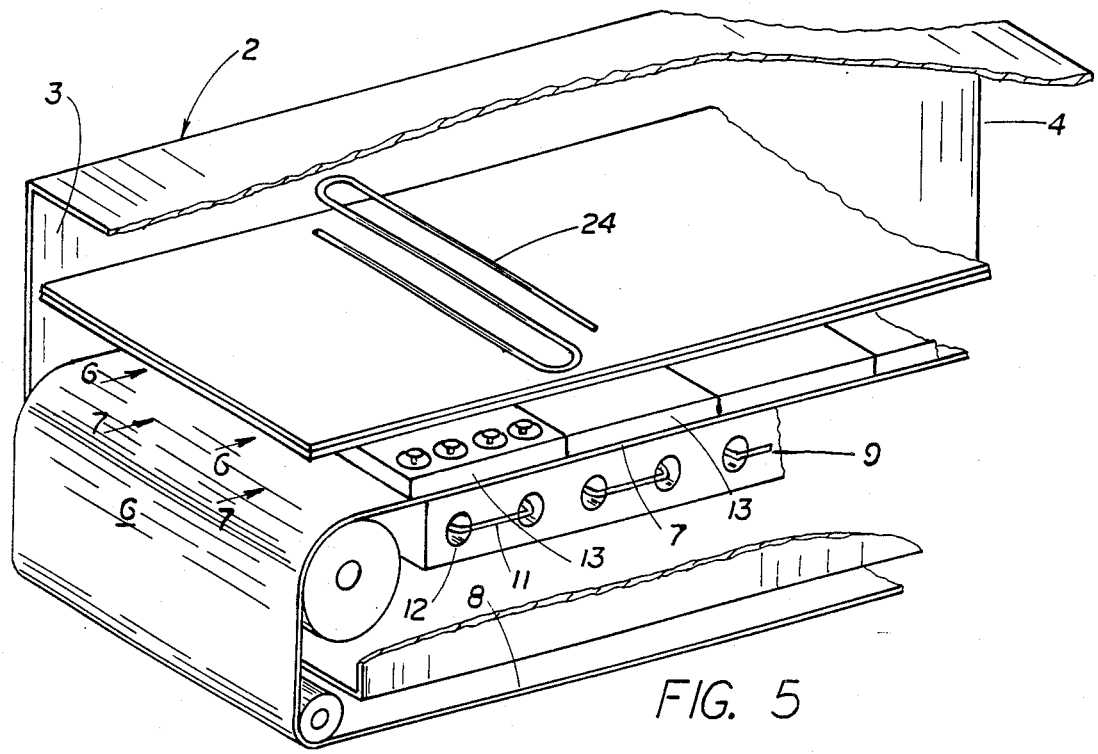
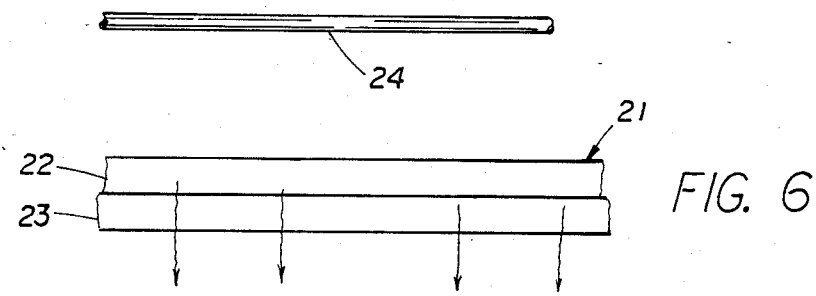
FIG. 6
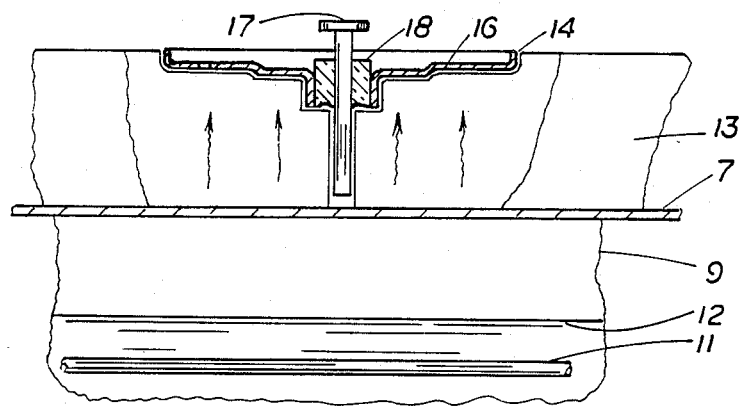
FIG. 7

APPARATUS FOR MANUFACTURING HERMETIC TERMINAL ASSEMBLIES

This is a divisional of copending application Ser. No. 732,704, filed on May 10, 1985, now U.S. Pat. No. 4,804,396, issued Feb. 14, 1989.

BACKGROUND OF THE INVENTION

The present invention relates to hermetic terminal assemblies and, more a method and apparatus for fusing glass sleeved terminal pins in housing parts, such as battery covers of the button type.

In the past it has been the practice to assemble terminal pins supportedly disposed in apertures of metallic housing parts such as button type batteries by fusing the glass sleeves surrounding the pins into the housing parts with high intensity heat sufficient to flow the glass and accomplish fusion of the several assembled parts. The present invention recognizes that past fusion processes have not always been entirely successful, with voids developing in the flowed glass which, on occasion, have resulted in wekened hermetic seals and consequent discarding of entire assemblies. Further, such past melting processes often have been inefficient in operation and maintenance, requiring large quantities of energy and complex machinery to carry out the processes.

The present invention, recognizing the deficiencies and inadequacies of past operations, and, more particularly, recognizing the importance of controlling the direction of glass flow, provides a unique, useful and efficient method and apparatus for eliminating such deficiencies and inadequacies, the novel method and apparatus being straightforward and economical in operation and maintenance, resulting in the efficient production of high quality terminal assemblies with a minimum of rejection and failure.

It is generally known in the heating oven art to control the amount of heat emission, such as is taught by unexpired U.S. Pat. No. 4,331,858, issued to D. L. Wagner on May 25, 1982; No. 4,164,642, issued to E. Ebert on Aug. 14, 1979 and No. 3,471, 682, issued to R. M. Hisey, et al on Oct. 7, 1969; all of which teach the control of infrared wave lengths and which utilize reflective and shielding radiation devices. Expired U.S. Pat. No. 3,045,100, issued to C. A. Mills on July 17, 1962, also broadly teaches the utilization of carbon black to control heat ray emission. Further, expired U.S. Pat. No. 3,052,789, issued to B. E. Trainor on Sept. 4, 1962; and No. 3,157,476; issued to H. L. Smith, Jr. on Nov. 17, 1964, both teach devices for controlling and reflecting radiant heat energy. However, none of the aformentioned patents teaches or even remotely suggests the novel method and apparatus of the present invention which, not only recognizes the importance of controlling heating and glass flow in a preselected direction, but which also accomplishes the same in a unique and novel fashion.

Various other features of the present invention will become obvious to one skilled in the art upon reading the disclosure set forth hereinafter.

SUMMARY OF THE INVENTION

More particularly, the present invention provides a method of forming glass to metal hermetic seals in a terminal assembly of a housing part having a terminal pin receiving aperture extending therein comprising: inserting a terminal pin surrounded by a glass sleeve into the aperture of the housing part; inserting the housing part with the pin and glass sleeve supportedly disposed in the aperture thereof into a heating zone with the longitudinal axes of the pin and glass sleeve supported in the aperture of the housing part in a substantially vertical position; and applying an upwardly directed glass flow heating gradient to the housing part while disposed in the heating zone sufficient to cause the glass sleeve to flow in an upwardly direction from bottom to top to firmly fuse the terminal pin in the housing part aperture with minimal voids. In addition, the present invention provides an apparatus for forming glass to metal seals in terminal assemblies of apertured housing parts having glass sleeved terminal pins supportedly extending in the apertures of the housing parts comprising: an enclosed oven chamber having an inlet end and an outlet end; an endless conveyor flight disposed to moveably pass within the chamber to carry housing parts thereon with the glass sleeved pins in substantially vertical position for preselected residence periods; and heating means disposed within the chamber arranged to apply an upwardly directed glass flow heating gradient to the housing parts while disposed in the chamber to cause the glass sleeves of the pins to flow in an upwardly direction from bottom to top to firmly fuse the terminal pins in the housing parts with minimal voids. Further, the present invention provides a novel heat conductive support fixture recessed to receive the housing parts and supportedly maintain them in preselected position to optimize the heat gradient.

It is to be understood that various changes can be made by one skilled in the art in the several steps of the method and in the several parts of the apparatus disclosed herein without departing from the scope of spirit of the present invention.

BRIEF DESCRIPTION OF THE DRAWINGS

Referring to the drawings which disclose one advantageous embodiment of the present invention and a modification thereof:

FIG. 5 is a partially broken away isometric view of a portion of a modified embodiment of the novel heating oven arrangement;

FIG. 6 is an enlarged cross-sectional view of a portion of the heating oven of FIG. 5, taken in a plane passing through line 6—6 of FIG. 5, disclosing details of the inventive plate assembly; and, FIG. 7 is an enlarged cross-sectional view of a portion of the heating oven of FIG. 5 taken in a plane passing through line 7—7 of FIG. 5, disclosing details of the novel application of a heating gradient across the terminal assembly of a battery cover.

DETAILED DESCRIPTION OF THE DRAWINGS

Figure 1:
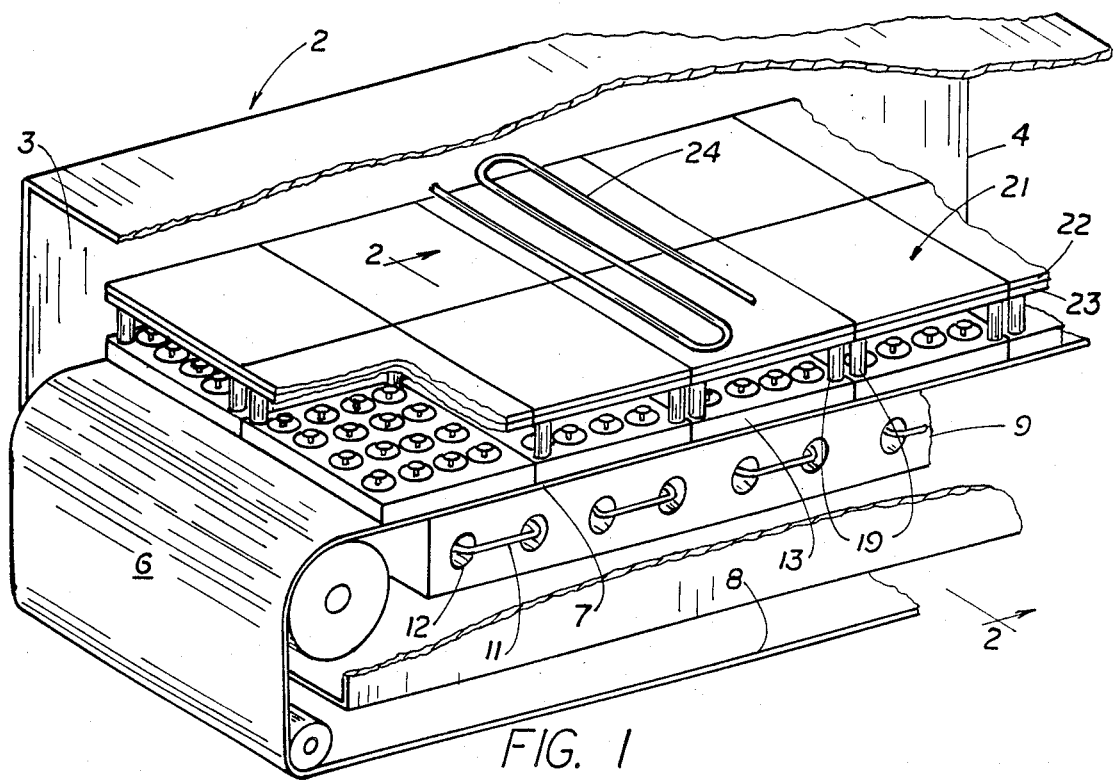
FIG. 1 is a partially broken away isometric view of a portion of the novel heating oven arrangement.

Referring to FIG. 1 of the drawings, there is disclosed an enclosed longitudinally extending oven housing chamber 2 having opposed inlet and outlet ends 3 and 4 respectively, the outlet end not being disclosed in detail because of illustrative limitations. Disposed within oven chamber 2 is the upper flight of an endless conveyor belt 6. Belt 6 can be a thin endless mesh stainless steel or similar heat conductive metal belt of metallic laced plate carrying loops trained about a pair of spaced rotatably mounted rollers, sprockets or pulleys located adjacent the opposed inlet and outlet ends of the oven. As is known in the conveyor art either one or both of the pulleys may be motor driven to move the belt from the inlet end 3 of oven 2 to outlet end 4. It is to be understood that other types of endless conveyors could also be utilized with oven 2 without departing from the applicant's inventive concept disclosed, conveyor 6 includes upper load carrying flight 7 and spaced lower flight 8, the upper flight being disposed within oven chamber 2 and the lower flight 8 being disposed outside oven chamber 2 to increase belt life. Upper flight 7 serves to carry the housing parts or battery covers with their glass sleeved terminal pins (described hereinafter) from the inlet end 3 of oven 2 to outlet end 4. It is to be understood that conveyor 6 can be driven at preselected speeds to control the residence time of the article to be treated in the oven for a preselected period in accordance with other heating parameters and the results desired.

Disposed immediately below upper flight 7 of conveyor 6 is a first or primary heating means 9. Heating means 9 includes a heat conductive floor which advantageously can be in the form of a silicon carbide slab having spaced transversely extending electric heating elements 11. Elements 11, which advantageously can be of a nickle chromium alloy ("nichrome") or other suitable electrically conductive materials, extend in a transverse fashion to the direction of flight movement in spaced relation to the walls of transversely extending expansion passages 12. Heating means 9 serves to transmit a major portion of a preselected heating gradient maintained in oven 2 upwardly through the upper flight 7 of endless conveyor 6 to the housing parts to be treated as they are moved through oven 2 on flight 7.

Figure 2:
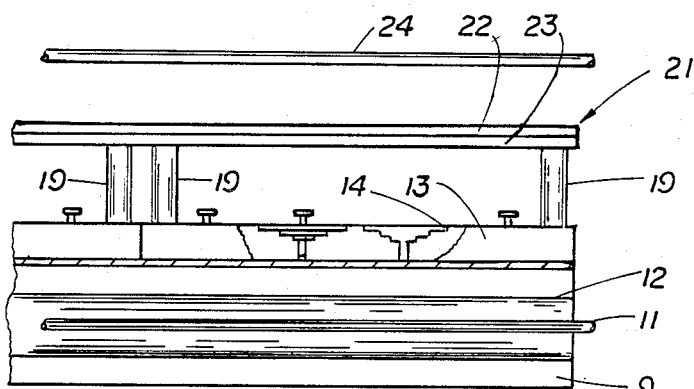
FIG. 2 is an enlarged cross-sectional view of a portion of the heating oven of FIG. 1, taken in a plane passing through line 2—2 of FIG. 1, a terminal assembly and housing part being removed to illustrate a recess in the fixture.
Figure 3:
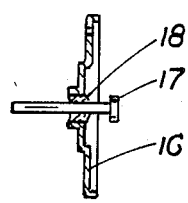
FIG. 3 is an enlarged cross-sectional view of a terminal assembly and housing part in the form of a battery cover such as disclosed in FIGS. 1 and 2.
Figure 4:
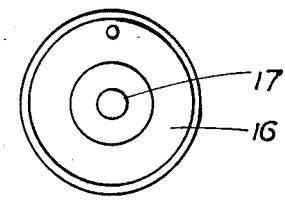
FIG. 4 is a top view of the terminal assembly and housing part of FIG. 3.

Referring to FIGS. 1 and 2 of the drawings, a plurality of heat conductive carbon support fixtures 13 are disclosed as removeably mounted in contiguous relationship to rest on upper flight 7 of endless conveyor 6. Each fixture 13 includes rows of spaced recesses. As can be seen in FIG. 2, each recess 14 in carbon fixtures 13 is contoured to snuggly receive and firmly support a housing part in the form of a metallic, heat conductive battery cover 16 (FIG. 3). Battery cover 16 has a centrally disposed aperture therein to receive terminal pin 17 and surrounding cylindrical glass sleeve 18 assembly therein. In glass sealing operations, the recessed carbon fixtures 13 serve to hold and support the battery covers 16 with the glass sleeves 18 and terminal pins 17 supportedly assembled in the apertures thereof in a vertical, preselected position relative their battery covers.

As can also be seen in FIGS. 1 and 2 of the drawings, each carbon fixture 13 is provided with a set (four) of spaced ceramic vertical columns 19. Columns 19 can be removably or permanently mounted on carbon fixtures 13 and serve to support the heat control plate assemblies 21. Each plate assembly 21 includes an upper ceramic plate 22 having a white metallic powdered heat reflective coating on the upper surface thereof and a lower heat absorptive black, carbon plate 23 facing the lower surface of upper plate 22. Positioned above plate assemblies 21 in spaced relation thereto to extend in a transverse fashion to the direction of flight movement in spaced relation to each other are electrical heating elements 24 which, like heating elements 11, can also be of a suitable nichrome alloy. These elements 24 serve as a second or minor heating means in oven chamber 2 to impart sufficient energy to fixture 13 to insure flow of glass sleeves 18 in battery covers 16 with optimum heat energy usage. In this regard and referring to FIG. 6, it can be seen that a portion of the heat energy from electric heating elements 24 is reflected by the metallic coating o the upper surface of plate 22 and a portion of the heat energy is conducted through the absorptive lower carbon plate 23 to radiate a very minor portion of the heat to fixtures 13 and the housing parts with the terminal assemblies supported thereon.

Referring to FIG. 5, a modified structure is disclosed with plate assembly 21 including upper reflectively coated ceramic plate 22 and lower absorptive carbon plate 23, each being a continuous longitudinally extending sheet which can be supported from housing oven chamber 2. With such an arrangement the individual sets of vertical columns 19 on fixtures 13 can be eliminated.

Referring to FIGS. 1, 6 and 7 of the drawings, in a typical operation of forming glass to metal hermetic seals in the terminal assemblies of metallic battery covers 16, each battery cover, as aforenoted, having a centrally disposed terminal pin receiving aperture extending therethrough, a terminal pin 17 surrounded by a glass sleeve 18 is inserted into each of the pin receiving apertures of battery covers 16. The battery covers with the pins and sleeves assembled therein are supportedly mounted in the recesses of heat conductive carbon support fixtures 13 with the longitudinal axes of pins 17 and glass sleeves 18 positioned in substantially vertical position on the fixtures when the fixtures are placed in contiguous relation on the upper flight 7 of heat conductive endless conveyor 6 at inlet end 3 of oven chamber 2. Conveyor 6 is driven at a preselected speed by a suitable motor (not shown) to maintain the glass sleeves in the heating zone for a preselected residence time. Advantageously, the residence time in the oven is selected to be in the range of approximately ten minutes to 40 minutes, the specific temperatures selected depending upon such parameters as the specific heats involved, the heat conductivity properties of the materials involved and the oven temperatures involved. Advantageously, oven temperature ranges from approximately 1500° F. to approximately 1900° F. can be utilized. Such oven temperatures in oven chamber 2 are obtained through electric heating elements 11 and 24.

As can be seen in FIG. 7, a major portion of a glass melting heating gradient is transmitted conductively from heating elements 11 through silicon carbide block up to the lower portion of metallic battery covers 16 through the upper flight 7 of the metallic endless heat conductive belt and the heat conductive contiguous carbon support fixtures 13. As can be seen in FIG. 6, a very minor portion of the heating gradient is transmitted radiantly to the upper portion of metallic covers 6 through the heat reflective surface on the upper ceramic plate 22 and the lower heat absorptive carbon plate 23 of plate assembly 21. Thus, glass sleeves 18 in battery covers 16 are caused to flow in an upwardly direction from bottom to top to firmly fuse terminal pins 17 in battery covers 16 with minimal voids occurring.

As aforenoted, various changes can be made in the structure and method disclosed without departing from the spirit of the present invention. For example, modifications to the heating elements, conveyor belt and to material selections of the several parts can be made by one skilled in the art to accommodate desired glass sealing conditions for specific articles t be fused.

Further, support fixtures can be modified to accommodate other types of terminal assemblies such as those where one or more glass sleeved pins are disposed in an assembly cover in a off-center relationship.

The invention claimed is:

1. An apparatus for forming glass to metal hermetic seals in terminal assemblies of apertured housing parts having glass sleeved terminal pins extending in the apertures of said housing parts comprising: an enclosed chamber having an inlet end and an outlet end; an endless conveyor flight disposed to moveably pass within said chamber to carry housing parts thereon with the glass sleeved pins supportedly disposed in substantially vertical position for preselected residence periods; and heating means disposed within said chamber arranged to apply at least the major portion of a total heating gradient to be transmitted to said glass sleeved pins in an upwardly directed glass flowing heating gradient to said housing parts while disposed in said chamber to flow the glass sleeves of said pins in an upwardly direction from bottom to top to firmly fuse the terminal pins in said housing parts with minimal voids. elements extending above said endless conveyor flight along the length thereof to transmit a minor portion of said glass flowing heating gradient to the upper portion of said housing parts.

2. The apparatus of claim 1, said heating means including a heat conductive floor having first heating elements disposed therein, said heat conductive floor extending under said endless conveyor flight along the length thereof to transmit the major portion of said glass flowing heating gradient to the lower portion of said housing parts, said endless conveyor being heat conductive.

3. The apparatus of claim 2, and second, heating elements extending above said endless conveyor flight along the length thereof to transmit a minor portion of said glass flowing heating gradient to the upper portion of said housing parts.

4. The apparatus of claim 3, said second heating elements having a heat reflective surface and a heat absorptive surface therebelow to restrict the amount of heat transmitted to he upper portion of said housing parts.

5. The apparatus of claim 3, and heat conductive fixtures adapted to receive and support said housing part with the glass sleeved pins supportedly disposed in substantially vertical position on said endless conveyor flights, said fixtures having supports thereon to carry plate members in spaced relation thereabove which form the heat reflective surface and heat absorptive surface below said second heating elements.

6. In apparatus for forming glass to metal hermetic seals in terminal assemblies of apertured housing parts having glass sleeved terminal pins extending in the apertures of said housing parts, a heat conductive support fixture for said housing parts, said support fixture being recessed to receive said housing part and support the same with the glass sleeved terminal pins supportively extending in substantially vertical position to permit a heat gradient to melt the glass sleeve from bottom to top.

7. The apparatus of claim 6, said support fixture having a plurality of spaced vertical columns thereon and plate means mounted on said columns in spaced relation above said fixture, said plate means including a heat reflective surface and a heat absorptive surface therebelow to restrict the amount of heat transmitted to the upper portion of said housing parts.

8. The apparatus of claim 7, said support fixture including rows of spaced recesses, each being contoured to receive a housing part and support the same with the glass sleeved terminal pin supportedly extending in, substantially vertical position.

9. The apparatus of claim 7, said plate means comprising a ceramic plate having white metallic powdered heat reflective coating on the upper surface thereof and a heat absorptive black carbon plate facing the lower surface thereof.

10. The apparatus of claim 7, said support fixture including rows of spaced circular recesses each being contoured to receive and firmly support a battery cover and a glass sleeved terminal pin assembled therein with the glass sleeved terminal pin supportedly extending in substantially vertical position and held in a preselected location relative the battery cover to which it is to be fused.

11. An apparatus for forming glass to metal hermetic seals in terminal assemblies of metallic battery covers having glass sleeved terminal pins extending in the apertures of said covers comprising: an enclosed longitudinally extending oven chamber having opposed inlet and outlet ends; a heat conductive endless conveyor flight disposed within said chamber to moveably pass within said chamber to carry said battery covers with supportedly disposed glass sleeved terminal pins therein from said inlet end to said outlet end for a preselected residence time; first heating means including a silicon carbide floor having spaced transversely extending nichrome heating elements disposed therein, said heat conductive silicon carbide floor extending under said metallic endless conveyor flight along the length thereof to transmit a major portion of a heat gradient conductively through said metallic endless conveyor flight; a plurality of heat conductive carbon support fixtures adapted to be mounted on said conveyor flight in contiguous relationship, each carbon fixture including rows of spaced recesses, each of which is contoured to snuggly receive and firmly support a battery cover and at least one glass sleeved terminal pin assembly within the glass sleeved terminal pin supportedly extending in substantially vertical position and held in a preselected location relative the battery cover; a set of spaced vertical columns mounted on each fixture; a plate assembly mounted on the upper ends of said columns in spaced relation from said fixture, said plate assembly including a ceramic plate having a white metallic powdered heat reflective coating on the upper surface thereof and a heat absorptive black carbon plate facing the lower surface thereof; and second heating means comprised of spaced nichrome heating elements transversely extending above said plate assemblies of said fixtures to transmit a minor portion of the glass melting heating gradient to the upper portion of said fixtures and battery cover assemblies disposed thereon to melt the glass sleeves of said pins in an upwardly direction from bottom to top to firmly fuse the terminal pins in their battery covers with minimal voids.

* * * * *

UNITED STATES PATENT AND TRADEMARK OFFICE
CERTIFICATE OF CORRECTION

PATENT NO. : 4,888,039

DATED : December 19, 1989

INVENTOR(S) : Benjamin Bowsky

It is certified that error appears in the above-identified patent and that said Letters Patent is hereby corrected as shown below:

Column 4, line 17 delete " o " and insert -- on --

Column 5, line 11 delete " t " and insert -- to --

Column 5, lines 32-36.           after "voids." delete "elements extending above said endless conveyor flight along the length thereof to transmit a minor portion of said glass flowing heating gradient to the upper portion of said housing parts."

Column 5, line 53.  Claim 4 delete "he" insert -- the --;

Column 6, line 51.  Claim 11 delete "within " insert -- therein with --;

Signed and Sealed this

Thirtieth Day of July, 1991

Attest:

HARRY F. MANBECK, JR.

*Attesting Officer*

*Commissioner of Patents and Trademarks*